United States Patent
Chang et al.

(10) Patent No.: US 7,148,877 B2
(45) Date of Patent: Dec. 12, 2006

(54) LIQUID CRYSTAL DISPLAY WITH OPTICAL DISK DRIVE CONTROL FUNCTIONS

(75) Inventors: Jung-Wen Chang, Tao Yuan Hsien (TW); Wen-Hsiang Chen, Taipei Hsien (TW)

(73) Assignee: Quanta Computer, Inc., Tao Yuan Hsien (TW)

( * ) Notice: Subject to any disclaimer, the term of this patent is extended or adjusted under 35 U.S.C. 154(b) by 471 days.

(21) Appl. No.: 10/658,391

(22) Filed: Sep. 10, 2003

(65) Prior Publication Data

US 2004/0227724 A1 Nov. 18, 2004

(30) Foreign Application Priority Data

May 15, 2003 (TW) .............................. 92208907 U

(51) Int. Cl.
*G09G 5/00* (2006.01)
*G09G 3/36* (2006.01)

(52) U.S. Cl. ........................ 345/156; 345/104; 345/173

(58) Field of Classification Search ........ 345/156–178, 345/87–104
See application file for complete search history.

(56) References Cited

U.S. PATENT DOCUMENTS

| | | | |
|---|---|---|---|
| 6,486,914 B1 * | 11/2002 | Anderson | .............. 348/333.02 |
| 6,882,335 B1 * | 4/2005 | Saarinen | ...................... 345/156 |
| 6,903,927 B1 * | 6/2005 | Anlauff | ...................... 361/681 |
| 2002/0041753 A1 * | 4/2002 | Itoh | .............................. 386/46 |
| 2002/0051629 A1 * | 5/2002 | Endo | ........................... 386/113 |
| 2004/0001049 A1 * | 1/2004 | Oakley | ........................ 345/173 |
| 2004/0027337 A1 * | 2/2004 | Hunt et al. | .................. 345/173 |
| 2004/0027338 A1 * | 2/2004 | Lampson | ..................... 345/173 |

* cited by examiner

*Primary Examiner*—Richard Hjerpe
*Assistant Examiner*—M. Fatahiyar
(74) *Attorney, Agent, or Firm*—Rabin & Berdo, PC

(57) ABSTRACT

A liquid crystal display with optical disk drive control functions is described. The liquid crystal display is utilized in a notebook/tablet dual-purpose computer. The liquid crystal display has a liquid crystal display panel, a plurality of control buttons, and an option determining device. The control buttons can directly control the optical disk drive to play an optical disk content on the liquid crystal display panel after the control functions of the control buttons are set by the option determining device. The option determining device is capable of switching within predetermined working functions of the liquid crystal display. The computer is capable of playing the optical disk content as a central processing unit thereof shuts down. The option determining device further includes an option controller and an option inductor to switch the liquid crystal display to a handwriting input panel and set the functions of the control buttons.

18 Claims, 3 Drawing Sheets

LIQUID CRYSTAL DISPLAY WITH OPTICAL DISK DRIVE CONTROL FUNCTIONS

FIELD OF THE INVENTION

The present invention relates to a liquid crystal display and especially to a liquid crystal display with optical disk drive control functions.

BACKGROUND OF THE INVENTION

Recently, liquid crystal displays (LCD) have been widely applied in electrical products, due to the rapid progress of optical technology and semiconductor technology. Moreover, with the advantages of high image quality, compact size, light weight, low driving voltage, and low power consumption, LCDs have been introduced into portable computers, personal digital assistants, color televisions, and are gradually replacing the cathode ray tubes (CRT) used in conventional displays. LCDs are becoming the mainstream display apparatus.

Notebook computers are convenient to carry and therefore are often carried to business meetings. In different environments, the notebook computer has to provide different display angles to enhance the demonstration capabilities thereof. However, due to a conventional restricted display angle, the notebook computer cannot provide all viewers with clear images on the display. Moreover, due to software and hardware improvements, a tablet personal computer (Tablet PC) introduces a computer with a hand writing input device on the display thereof. The tablet PC changes the input habits of the computer user and advances the information industry to a new milestone. A notebook/tablet dual-purpose computer with high processing performance combines the hand writing input device on the display panel and the keyboard input of the notebook computer. The notebook/tablet dual-purpose computer provides a humanizing input interface for a user who usually works in a moving environment. The display of a notebook/tablet dual-purpose computer can rotate about 180 degrees so that viewers around the tablet PC can see the information and images on the display more easily than before.

In general, the notebook/tablet dual-purpose computer with a rotatable liquid crystal display provides not only various display functions but also an optical disk playing function. However, the control button for the optical disk is covered by the liquid crystal display when the liquid crystal display locks onto the computer base and the liquid crystal display panel is exposed. Therefore, if the user wishes to play an optical disk, the liquid crystal display has to be first released from the computer base. Otherwise, the notebook/tablet dual-purpose computer has to turn on a central processing unit thereof to run an operating system and an application software for operating the optical disk.

Therefore, there is a need for quick and effective operation of the optical disk drive for a notebook/tablet dual-purpose computer with a rotatable liquid crystal display.

SUMMARY OF THE INVENTION

It is an object of the present invention to provide a liquid crystal display with optical disk drive control functions to control effectively the optical disk drive with control buttons on the liquid crystal display.

It is another object of the present invention to provide a liquid crystal display with optical disk drive control functions to control the optical disk drive without turning on the central processing unit and running the operating system of the notebook/tablet dual-purpose computer.

It is further another object of the present invention to provide a liquid crystal display with optical disk playing functions to change the notebook/tablet dual-purpose computer into an optical disk player for playing an optical disk so as to broaden the application scope of the notebook/tablet dual-purpose computer.

To accomplish the above objectives, the present invention provides a liquid crystal display with an optical disk drive control function. The liquid crystal display includes a liquid crystal display panel, a plurality of control buttons, and an option determining device. The liquid crystal display panel demonstrates an optical disk content playing in an optical disk drive and the option determining device sets the functions of the liquid crystal display panel and the control button capable of directly controlling the optical disk drive. The option determining device is disposed on the liquid crystal display to change the functions of the liquid crystal display and the control buttons.

The liquid crystal display can be changed to a hand writing panel or a video output device of the optical disk drive. The control buttons can still directly control the optical disk drive, even when a central processing unit of the notebook/tablet dual-purpose computer is turned off, because the option determining device sets the liquid crystal display as the video output device and the control buttons with operation functions of the optical disk drive. The control buttons can become a play button, a stop button and a fast forward button.

The option determining device further includes an option controller and an option inductor. While the option inductor senses the option controller, the liquid crystal display panel switches to a hand writing panel. The option inductor is a reed switch and the option controller is a magnet.

It is another aspect of the present invention to provide a notebook/tablet dual-purpose computer. The computer includes a computer base, an optical disk drive, an option inductor, a rotation shaft, and a liquid crystal display. The optical disk drive and the option inductor are mounted in the computer base. The rotation shaft couples the liquid crystal display to the computer base so that the liquid crystal display can rotate on the computer base horizontally. The liquid crystal display further includes a liquid crystal display panel, a plurality of control buttons, and an option controller. The option controller is disposed on the liquid crystal display, normally at the periphery of the liquid crystal display, and the liquid crystal display panel switches to a hand writing panel when the option inductor detects the option controller. The notebook/tablet dual-purpose computer can play an optical disk in the optical disk drive for display on the liquid crystal display without turning on a central processing unit of the notebook/tablet dual-purpose computer.

It is further another aspect of the present invention to provide a liquid crystal display with an optical disk playing function. The liquid crystal display comprises a notebook/tablet dual-purpose computer and a display shelf. The notebook/tablet dual-purpose computer can directly play an optical disk with the control buttons on the liquid crystal display and without turning on a central processing unit of the notebook/tablet dual-purpose computer.

Hence, the liquid crystal display with an optical disk control function according to the present invention can directly use the control buttons disposed on the liquid crystal display to control the optical disc drive while the liquid crystal display is closed on the computer base. Moreover, the notebook/tablet dual-purpose computer becomes an optical disk player to extend effectively the application scope of the notebook/tablet dual-purpose computer and especially to reduce the power consumption thereof because the notebook/tablet dual-purpose computer can directly play the optical disk on the liquid crystal display without turning on the central processing unit thereof.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein:

FIG. 2 is a schematic view of the preferred embodiment of FIG. 1 with the liquid crystal display thereof closed on the computer base; and.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
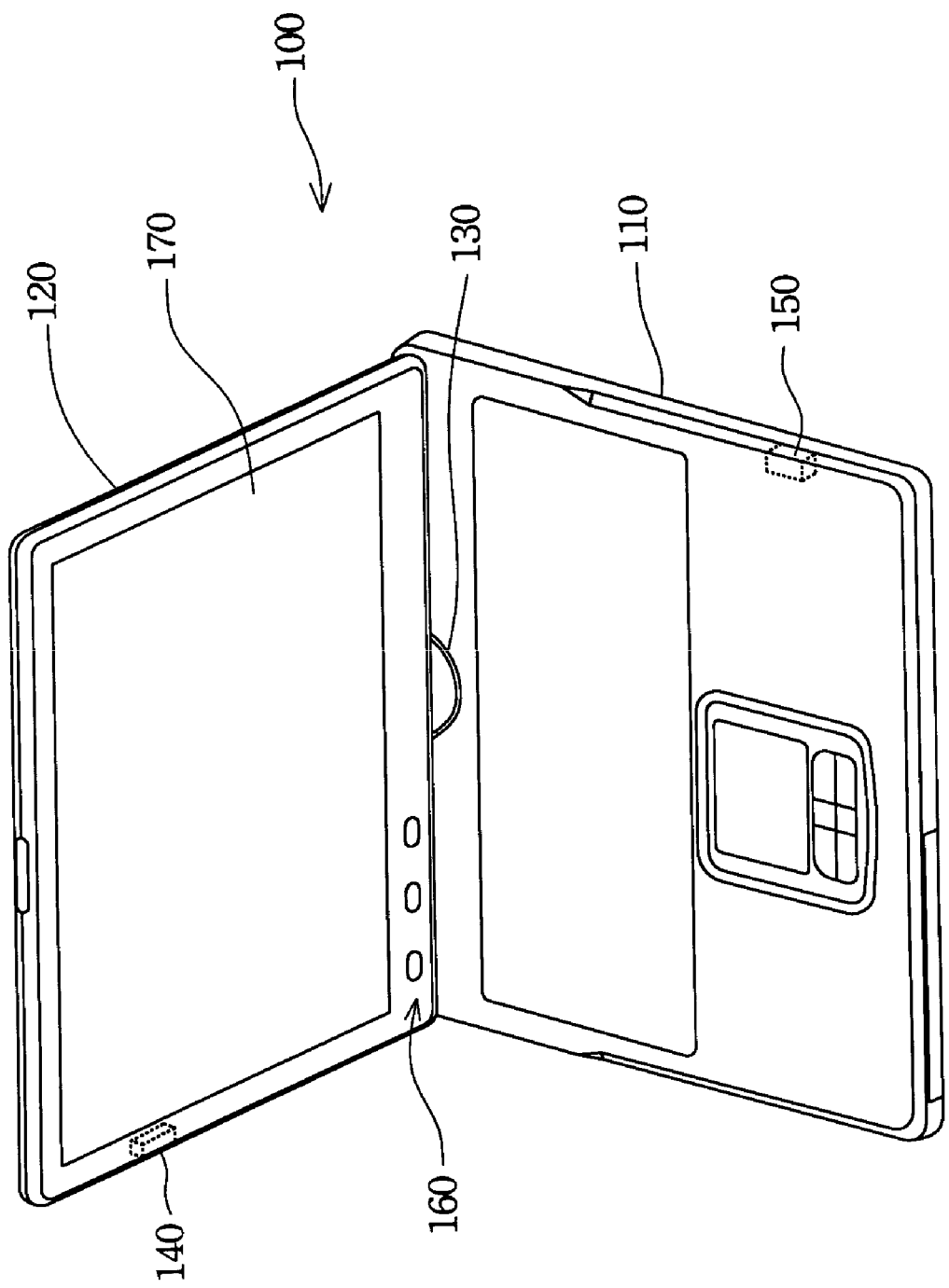
FIG. 1 is a schematic view of a preferred embodiment of a notebook/tablet dual-purpose computer having a liquid crystal display with optical disk drive control functions according to the present invention.

FIG. 1 is a schematic view of a preferred embodiment of a notebook/tablet dual-purpose computer having a liquid crystal display with optical disk drive control functions according to the present invention. The liquid crystal display with optical disk drive control functions 120 according to the present invention includes a liquid crystal display panel 170, and control buttons 160 thereunder. A computer base 110 of the notebook/tablet dual-purpose computer 100 includes an option inductor 150 to set and change functions of the control button 160 and the liquid crystal display 120 of the notebook/tablet dual-purpose computer 100.

Figure 2:
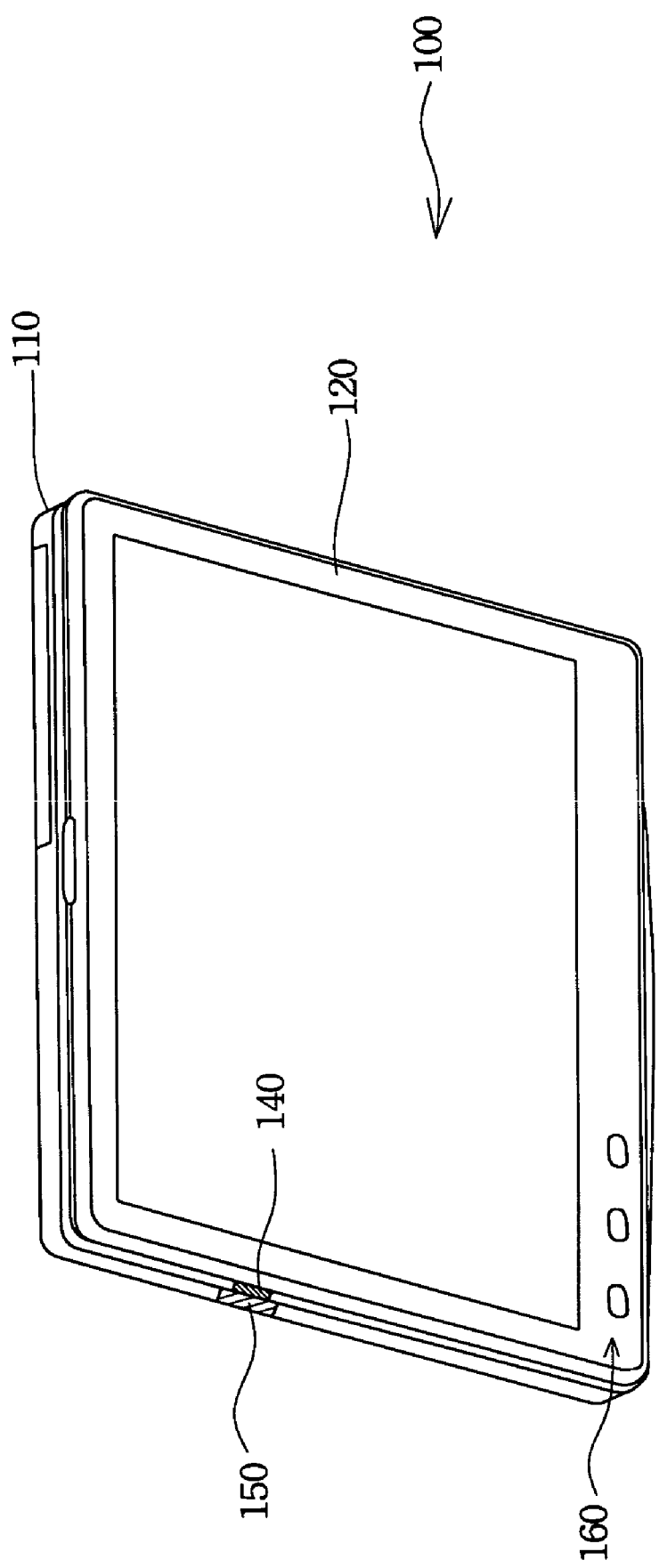

The notebook/tablet dual-purpose computer 100 includes at least two operation modes, such as a laptop mode and a slate mode. In FIG. 1, the notebook/tablet dual-purpose computer 100 is working in the laptop mode which operates similar to a conventional notebook. In FIG. 2, the notebook/tablet dual-purpose computer 100 is working in the slate mode while the liquid crystal display is rotated about 180 degrees around the rotation shaft 130 and closed on computer base 110 of the notebook/tablet dual-purpose computer 100. The option inductor 150 determines functions of liquid crystal display 120 and the control button 160 according to a corresponding position of the liquid crystal display 120 whether or not an option controller 140 is mounted thereon.

FIG. 2 is a schematic view of the preferred embodiment of FIG. 1 with the liquid crystal display thereof closed on the computer base. The option inductor 150 senses the existence of the option controller 140 while the liquid crystal display 120 with the option controller 140 is rotated about 180 degrees and closed on the computer base 110; that is, the liquid crystal display panel 170 is exposed. In the meantime, the liquid crystal display panel 170 switches to a hand writing panel and the control buttons 160 switch to slate mode function buttons, e.g. a security button, a function switch button, a screen orientation button, an escape button, an enter button, a scrolling up button, a scrolling down button, or any other function button or combination function button thereof.

The liquid crystal display 120 switches to an image output device of an optical disk player when the option inductor 150 does not sense the existence of the option controller 140. In the meantime, the control buttons 160 switch to optical disk player function buttons, e.g. a play button, a stop button, a forward button, a pause button, a backward button, or any other player function button or combination function button thereof.

The option controller 140 and the option inductor 150 can be hidden in the shells of the notebook/tablet dual-purpose computer. An exemplary preferred embodiment of the option controller 140 is made of a magnetic material such as a magnet. An exemplary preferred embodiment of the option inductor 150 is an inductive switch, such as a reed switch, for sensing the existence of the option controller 140. That is, the option inductor 150 and the option controller 140 constitute an option determining device according to the present invention so that the option determining device can determine the functions of the liquid crystal display 120 and the control buttons 160 according to the sensing state thereof. The option determining device is not limited to the magnetic inductor and controller, and even a mechanical switch disposed on the liquid crystal display 120 or the computer base 110 of the notebook/tablet dual-purpose computer to switch the functions of the liquid crystal display 120 and the control buttons 160 is within the spirit and scope of the present invention. The positions of the option controller 140 and the option inductor 150 are changeable and switchable so that the liquid crystal display 120 and the control buttons 160 may have more different function selections. As is understood by a person skilled in the art, the various modifications and similar arrangements are included within the spirit and scope of the present invention. For example, the liquid crystal display panel 170 switches to the optical disk player from the hand writing status and the functions of the control buttons 160 switch from display control function to the optical disk player control function when the option controller 140 senses the existence of the option inductor 150, or the option controller 140 is disposed in the computer base 110 and the option inductor 150 is disposed in the liquid crystal display 120. All the modifications and similar arrangements are included within the spirit and scope of the present invention.

In general, the liquid crystal display 120 switches to the image output device of an optical disk player when the option inductor 150 does not sense the existence of the option controller 140. The control buttons 160 on the liquid crystal display 120 switch to the optical disk player control function to control directly the optical disk player. That is, the central processing unit of a notebook/tablet dual-purpose computer 100 need not be turned on and can be directly controlled by the control buttons 160 when the liquid crystal display 120 switches to the image output device of an optical disk player.

Figure 3:
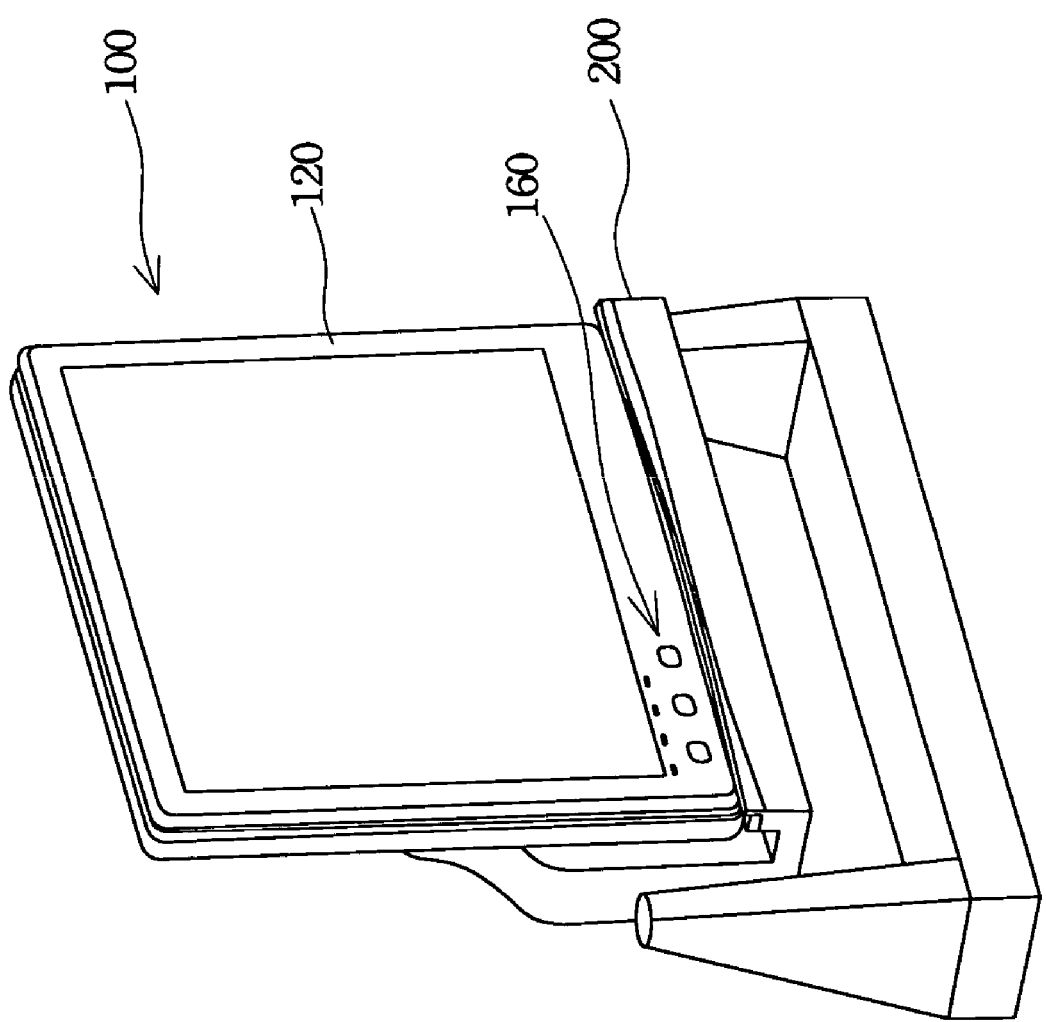
FIG. 3 is a schematic view of a notebook/tablet dual-purpose computer having a liquid crystal display with optical disk playing functions according to the present invention mounting on a display shelf.

FIG. 3 is a schematic view of a notebook/tablet dual-purpose computer having a liquid crystal display with optical disk playing functions according to the present invention mounted on a display shelf. The liquid crystal display with optical disk drive control functions according to the present invention provides a video play function thereon without turning on the central processing unit of the notebook/tablet dual-purpose computer. Hence, the notebook/tablet dual-purpose computer having the liquid crystal display 120 with optical disk playing functions according to the present invention can be mounted on a display shelf 200 while the computer is in the slate mode. Referring to FIG. 3, when the liquid crystal display 120 switches to the image output device of the optical disk player, the control buttons 160 switches to the control buttons of the optical disk player, and the computer is mounted on the display shelf 200, the notebook/tablet dual-purpose computer can simulate a liquid crystal display with optical disk playing functions or a liquid crystal television with playing optical disk functions.

Due to the liquid crystal display with optical disk drive control functions according to the present invention, the application scope and functions of the notebook/tablet dual-purpose computer can be broadened. The power consumption of the notebook/tablet dual-purpose computer can be reduced while the computer plays an optical disk, such as a digital video disk or a video compact disk, without turning on the central processing unit thereof. As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A liquid crystal display with optical disk drive control functions for a notebook/tablet dual-purpose computer, the liquid crystal display comprising:
   a liquid crystal display panel displaying contents of an optical disk playing in a optical disk drive;
   a plurality of control buttons disposed on the liquid crystal display to control the optical disk drive; and
   an option determining device disposed on the liquid crystal display to determine a predetermined working function of the liquid crystal display and set operation functions of the control buttons, wherein the option determining device further comprises an option controller and an option inductor, the option controller and the option inductor are disposed on the liquid crystal display and a computer base of the notebook/tablet dual-purpose computer, and the option controller and the option inductor determine the predetermined working function of the liquid crystal display and set the operation functions of the control buttons depending on whether the liquid crystal display is turned about 180 degrees and closed on the computer base to expose the liquid crystal display.

2. The liquid crystal display of claim 1, wherein the predetermined working function comprises a function to change the liquid crystal display panel to a hand writing panel when the option determining device sets the control buttons to operation functions of a slate mode.

3. The liquid crystal display of claim 2, wherein the control buttons comprise a security button, a function switch button, a screen orientation button, an escape button, an enter button, a rolling up button, and a rolling down button.

4. The liquid crystal display of claim 1, wherein the predetermined working function comprises a function to change the liquid crystal display panel to an image output device of the optical disk drive when the option determining device sets the control buttons to the operation functions of the optical disk drive.

5. The liquid crystal display of claim 4, wherein the control buttons directly control the optical disk drive while a central processing unit of the notebook/tablet dual-purpose computer is turned off.

6. The liquid crystal display of claim 4, wherein the control buttons comprise a play button and a stop button.

7. The liquid crystal display of claim 1, wherein the option inductor comprises a reed switch.

8. The liquid crystal display of claim 7, wherein the option controller comprises a magnet.

9. A notebook/tablet dual-purpose computer comprising:
   a computer base;
   an optical disk drive mounted in the computer base;
   an option inductor mounted in the computer base;
   a rotation shaft coupling with the computer base; and
   a liquid crystal display coupling with the rotation shaft, wherein the liquid crystal display further comprises:
   a liquid crystal display panel demonstrating contents of an optical disk playing in the optical disk drive;
   a plurality of control buttons disposed on the liquid crystal display to control the optical disk drive; and
   an option controller disposed on the liquid crystal display, wherein the option inductor and the option controller determine a predetermined working function of the liquid crystal display and set operation functions of the control buttons.

10. The notebook/tablet dual-purpose computer of claim 9, wherein the option inductor and the option controller switch the liquid crystal display panel to a hand writing panel and set the control buttons with operation functions of a slate mode.

11. The notebook/tablet dual-purpose computer of claim 9, wherein the option inductor and the option controller switch the liquid crystal display panel to a image output device of the optical disk drive and set the control buttons to operation functions of the optical disk drive.

12. The notebook/tablet dual-purpose computer of claim 11, wherein the control buttons directly control the optical disk drive while a central processing unit of the notebook/tablet dual-purpose computer is turned off.

13. The notebook/tablet dual-purpose computer of claim 11, wherein the control buttons comprise a play button and a stop button.

14. The notebook/tablet dual-purpose computer of claim 9, wherein the option inductor senses the option controller while the liquid crystal display is turned about 180 degrees and closed on the computer base.

15. The notebook/tablet dual-purpose computer of claim 9, wherein the option inductor comprises a reed switch and the option controller comprises a magnet.

16. A liquid crystal display with optical disk playing functions comprising:
   a notebook/tablet dual-purpose computer, wherein the notebook/tablet dual-purpose computer further comprises:
   a computer base;
   an optical disk drive mounting in the computer base;
   a rotation shaft coupling with the computer base; and
   a liquid crystal display coupling with the rotation shaft, the liquid crystal display rotating around the rotation shaft and demonstrating contents of an optical disk playing in the optical disk drive;
   a plurality of control buttons disposed on the liquid crystal display; and
   an option determining device disposed on the liquid crystal display to determine functions of the liquid crystal display and the control buttons, wherein the control buttons directly control the optical disc drive without turning on a central processing unit of the notebook/tablet dual-purpose computer if the option determining device sets the control buttons to have optical disk drive control functions.

17. The liquid crystal display with optical disk playing functions of claim 16 further comprising a display shelf for mounting the notebook/tablet dual-purpose computer thereon to play the optical disk content on the liquid crystal display which is mounted on the display shelf.

18. The liquid crystal display with optical disk playing functions of claim 17, wherein the control buttons further comprise a play button, a stop button and a fast forward button.

* * * * *